United States Patent [19]

Saldanha et al.

[11] Patent Number: 5,265,230
[45] Date of Patent: Nov. 23, 1993

[54] METHOD AND APPARATUS FOR DETERMINING SECTOR STATUS IN A DATA STORAGE DEVICE BY WRITING A STATUS OF READ-ONLY, WRITABLE, OR OBLITERATED IN AN ERROR RECOVERY AREA OF EACH SECTOR

[75] Inventors: Kevin S. Saldanha; Allen J. Piepho, both of Ft. Collins, Colo.

[73] Assignee: Hewlett-Packard Company, Palo Alto, Calif.

[21] Appl. No.: 574,632

[22] Filed: Aug. 29, 1990

[51] Int. Cl.$^5$ ............................................. G06F 12/16
[52] U.S. Cl. .................. 395/425; 364/DIG. 1; 369/275.2
[58] Field of Search ............... 369/275.1, 275.2, 275.3, 369/54, 56, 58; 395/400, 425; 364/200 MS File, 900 MS File

[56] References Cited

U.S. PATENT DOCUMENTS

| | | | |
|---|---|---|---|
| 4,831,611 | 5/1989 | Sasaki et al. | 369/58 |
| 4,958,314 | 9/1990 | Imai et al. | 395/425 |
| 4,975,898 | 12/1990 | Yoshida | 369/100 |
| 5,107,481 | 4/1992 | Miki et al. | 369/58 |

OTHER PUBLICATIONS

Van Wolverton, "Running MS-DOS" Jan. 1989, pp. 75-76, 160-161 and 420-421—Attribute Command Available for 3.0 Version— © about 1985.

Primary Examiner—Joseph L. Dixon
Assistant Examiner—Frank J. Asta

[57] ABSTRACT

An apparatus and method for allowing writable, magneto-optic (MO) data storage media to be defined as read-only. Because the MO media specification is compatible with WORM media, each sector of the media contains an error recovery section, called the defect management pointer (DMP). In MO media, error recovery information is stored at a common location, so the DMP of each sector is used to indicate the state of the sector—writable or read-only. A special data pattern is used to indicate whether the sector is blank or contains user data. With the DMP information set in the writable state, the sector can be written, however, the process of writing the sector also sets the DMP information to the data pattern that indicates that the sector is now in a read-only state. Once the storage state has been changed to the read-only state, the drive will no longer write data into this sector. The drive will also not allow the state to be changed from the read-only state back to the writable state. For data security purposes, data on media must sometimes be written over, or obliterated. After this process, the invention places a special pattern in the DMP, and thereafter, the drive can detect whether a sector contains user data, is blank, or has been obliterated.

7 Claims, 8 Drawing Sheets

METHOD AND APPARATUS FOR DETERMINING SECTOR STATUS IN A DATA STORAGE DEVICE BY WRITING A STATUS OF READ-ONLY, WRITABLE, OR OBLITERATED IN AN ERROR RECOVERY AREA OF EACH SECTOR

CROSS REFERENCE TO RELATED APPLICATIONS

This application is related to application Ser. No. 07/426,834, filed Oct. 25, 1989, now abandoned and assigned to the same entity.

BACKGROUND OF THE INVENTION

This invention relates to data storage devices and more particularly to optical disk data storage devices. Even more particularly, the invention relates to an apparatus and method for restricting the writing of information on optical disk media.

An optical disk is a data storage medium which is readable by a laser-based reading device. Optical disks, known as "compact disks" or "CD's", have become increasingly popular during the last few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks". Optical disks of the type used in computer applications are generally mounted in cartridges, and the reading devices generally read or write data through a slot provided on a surface of the cartridge.

One type of optical disk is often called "WORM" disks for Write-Once-Read-Many. WORM media is a type that can be written but cannot be rewritten. If an attempt is made to write on this media a second or subsequent times, the new data is written over the old data, resulting in garbled data which is unintelligible. A significant need exists for WORM media, however. This type of media is very useful for archive storage of data, wherein the data is intended to be written only once and never updated. A very significant aspect of WORM media, is that it always leaves an audit trail. Since it can only be written once, the data in a sector will always be the original data written in the sector. If a rewrite of the sector was attempted, it will be obvious from the garbled data and the CRC check data, which will be incorrect. In no case can the data in a sector be changed without leaving evidence of the change.

Recently a new type of optical disk media has been developed, called magneto-optic media or "MO" media. This type of media can be written, erased, and rewritten many times, in the same manner as magnetic media. Magneto-optic media is very important as a direct replacement for magnetic media, since it performs the same functions and allows a much larger storage capacity on a given disk.

Both types of media have important applications, however, it is very difficult and costly to design a single disk drive that can process both types of media. Therefore, if a computer needs to process both types of media two completely independent disk storage drives are needed.

There is a need then for a single media which can function either as WORM media, or as rewritable media. Various features and components of such a media are disclosed in U.S. patent application Ser. No. 07/426,834 filed October 25, 1989 for MULTI-FUNCTION OPTICAL DISK DRIVE AND MEDIA of Hoyle L. Curtis and Terry Lynn Loseke, which is hereby specifically incorporated by reference for all that is disclosed therein.

A similar problem has been addressed with magnetic media. Floppy disks for example, have a write protect notch which, if covered, prevents writing on the media. Therefore, a device can write on the media while the notch is uncovered, and then the notch can be covered to make the media "read-only". Magnetic tape has solved this problem in a similar way with a write ring, or in the case of tape cartridges with a record slide switch. These methods all suffer from the same drawback, that is, the mechanism is very easily reversed to make the media writable once again. In many operating systems, for example DOS on personal computers, a file can be marked as read-only after it has been initially written. Again, however, the read-only status is very temporary and can easily be reversed with another operating system command. Because the mechanism is easily reversed in all these cases, there is no audit trail.

This problem has also been partially addressed in a device, manufactured by Canon, Inc., called the "Canofile 250". This device allows an entire disk to be formatted as write-once. This device would appear to have two serious drawbacks, however. The process of formatting a disk is usually done by an operation system within the computer, which means that the write-once format is known only to that operating system, and other operating systems, not knowing of this format, might write over the media, leaving no audit trail. Another problem with this device is that the write-once status only applies to the entire media, therefore the media cannot be divided into write-once and rewritable portions.

Another problem that exists in converting rewritable media to write-once media is that drives that were manufactured prior to the design of the convertible media will not understand that the media is convertible and may write on the media even though it has been marked as read-only. This problem is similar to the above described problem wherein the operating system simply sets a bit identifying a file as read-only. Because the previously manufactured drive is unaware of the mechanism by which the media is converted to read-only, it will ignore such mechanism and write on the media. Therefore, one of the most difficult problems being faced in providing a convertible media, is the problem of designing a mechanism which will be recognized by previously manufactured drives.

It is very desireable, then, to provide a system that will allow media to be converted from rewritable media to write-once media. Because the nature of its construction, WORM media is incapable of being written to more than once. Magneto-optic media, however, can be rewritten TM many times. Therefore, there is need in the art to provide apparatus and method for allowing magneto-optic media to be converted to write-once media. There is a further need in the art for allowing portions of the media to be converted to read-only, while retaining other portions of the media as rewritable. A still further need in the art is to allow each sector of the magneto-optic media to be independently converted to read-only.

SUMMARY OF THE INVENTION

It is an object of the present invention to provide an apparatus and method of restricting the writing of data on optical media.

It is another object of the present invention to provide apparatus and methods for defining writable media as read-only media.

Still another object of the invention is to provide apparatus and methods for defining portions of writable media as read-only media.

Yet another object of the invention is to provide apparatus and methods for dynamically changing a portion of the media from writable to read-only.

A further object of the invention is to provide apparatus and methods to define writable media wherein each data sector of such media can be redefined from writable to read-only.

The above and other objects of the invention are accomplished in an apparatus and method for allowing writable data storage media to be defined as read-only. Because the magneto-optic (MO) media specification is compatible with WORM media, each sector of the media contains an error recovery information area, called the defect management pointer (DMP). In MO media, however, error recovery information is stored at a common location, so the DMP of each sector is not needed for error recovery. Therefore, the DMP area of each sector can be used to indicate the state of the sector—writable or read-only. A special data pattern is written into the DMP to indicate whether the sector is blank or contains user data. With the DMP information set in the writable state, the sector can be written, however, the process of writing the sector also sets the DMP information to the data pattern that indicates that the sector is now in a read-only state. Once the storage state has changed to the read-only state, the drive will no longer write data into this sector. The drive disables all commands that would allow the state to be changed from the read-only state back to the writable state.

For data security purposes, data on media must sometimes be written over, or obliterated. After this process, the invention places a special pattern in the DMP section of the sector, and thereafter, the drive can detect whether a sector contains user data, is blank, or has been obliterated.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In general, the present invention provides an apparatus and method for allowing writable data storage media, such as magneto-optic (MO) media, to be defined as read-only. ISO standard DIS 10089A, which is the standard for MO media, contains an error recovery information area following the user data, and when a sector is written the standard requires that these bytes be set to hexadecimal FF. In essence the standard does not use these bytes for any specific purpose, but includes them to maintain similarity with the WORM ISO standard, ISO 9171, where they hold defect management pointer (DMP) information. On WORM discs these pointers are used for error recovery when defective sectors are encountered. However, on rewritable discs, the error recovery information is more reliably and efficiently obtained from the Defect Management Areas (DMA) in a central location of the disc. Therefore, in MO media, the DMP can used to indicate the state of the sector—writable or read-only. When an MO media is erased, the resulting blank sectors contain largely invalid (RLL 2,7) data. When blank sectors pass through an RLL (2,7) decoder, default bit patterns are generated. In this case, these are hexadecimal "00" and consequently a blank sector has mostly hexadecimal "00" bytes in the DMP fields. When sector data is written, the DMP is written with a pattern of hexadecimal "FF" to indicate the read-only state. Once the storage state has been changed to the read-only state, the drive will no longer write data into this sector. Furthermore, the WRITE LONG command is disabled in the drive so that a user cannot write to the DMP area, therefore, the drive will not allow the state to be changed from the read-only state back to the writable state. Also, the erase command is disabled in the drive when the drive detects this type of media.

When the DMP bytes need to be inspected to determine the sector status, a READ LONG command is used to read the data, DMP, and ECC information, without using correction, into the processor memory. The DMP and ECC bytes are inspected, and used to determine the state. If the DMP and ECC bytes are inconclusive, a READ using the Error Correction Code (ECC) information, using correction, is undertaken to determine the status of the sector.

This system can also be used to distinguish between erased and written sectors on standard MO media. This capability is useful in a system that performs erased sector management where sectors are pre-erased during times of low user activity, thus enabling better write transfer rates.

On WORM discs there is sometimes a need to obliterate data in a sector, which makes the data unrecoverable and is useful in data security applications. When the obliterated sector must be recognized as having been obliterated, the sector is first erased, then a unique pattern of hexadecimal "C2" is written into the sector data DMP bytes, the CRC and ECC bytes. A read command would then return a read error, and the DMP can be checked for "C2" to determine if it has been obliterated.

This system also provides an optional mechanism to certify user areas on the disk before user data is committed to them. Since the media is rewritable, the controller writes all data areas of the media in order to test the write capability. Then the controller erases all the areas to prepare them to accept write once data. Further, the DMP bytes can be specifically inspected during the certification routine to screen out sections with bad DMP fields. This type of testing is unique to this type of implementation of write-once media.

Figure 1:
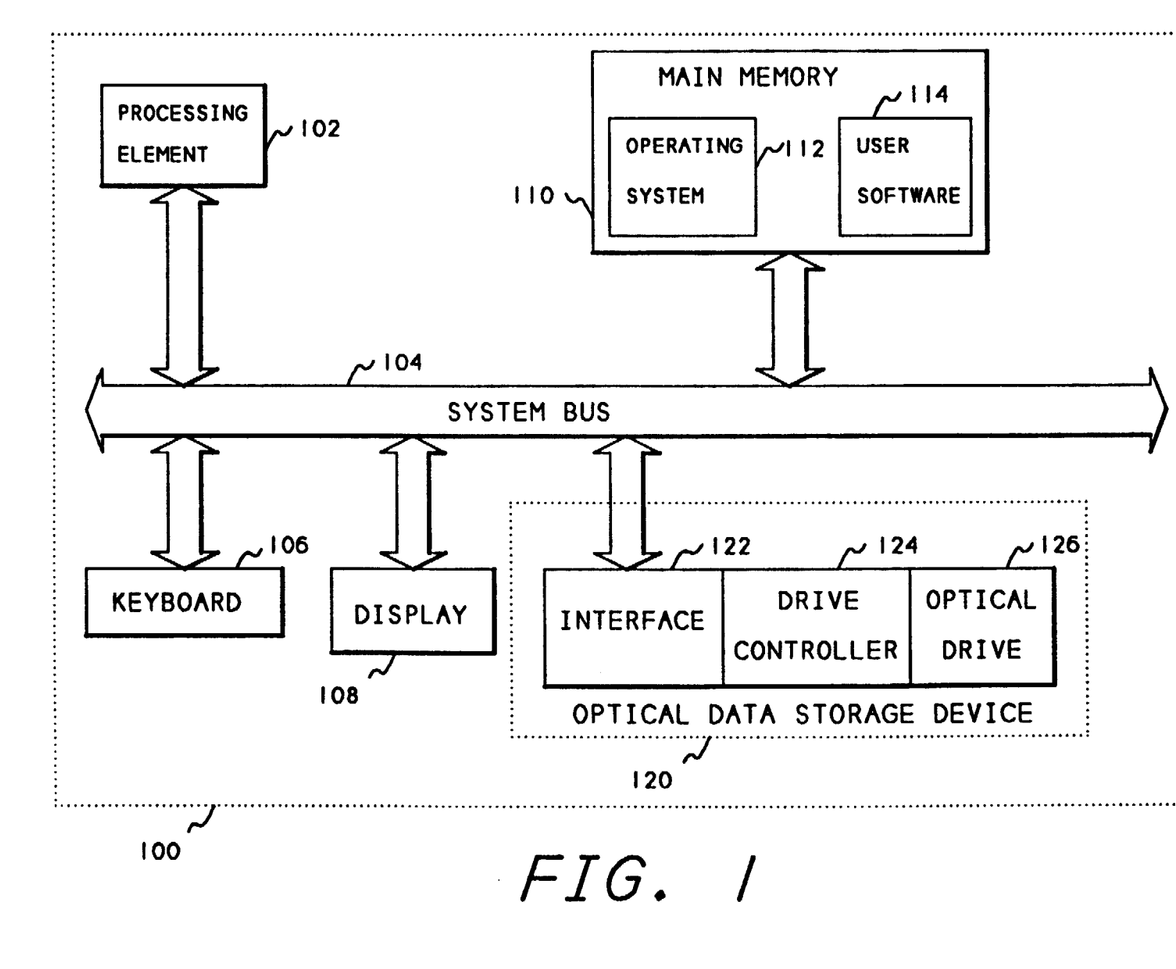
FIG. 1 is a block diagram of a computer system that incorporates the present invention.

FIG. 1 shows a block diagram of a computer system that incorporates the present invention. Referring now to FIG. 1, a computer system 100 is shown having a processing element 102. Data is transferred between the processing element 102 and all other parts of the system by a system bus 104. Attached to the system bus 104 is a keyboard 106 which allows a user to input data to the computer system 100. Also attached to the system bus 104 is a display 108 which allows the computer system 100 to display data to the user. A main memory 110 is attached to the system 104 and is used to store data and programs. Stored in the main memory 110 is an operating system 112 and user software 114. Also attached to the system bus 104 is the optical data storage device 120 of the present invention. Within the optical data storage device 120 is an interface 122 which connects the optical data storage device 120 to the system bus 104. Attached to the interface 122 is the drive controller 124 which contains all the electronics and firmware for controlling the optical drive 126.

Figure 2:
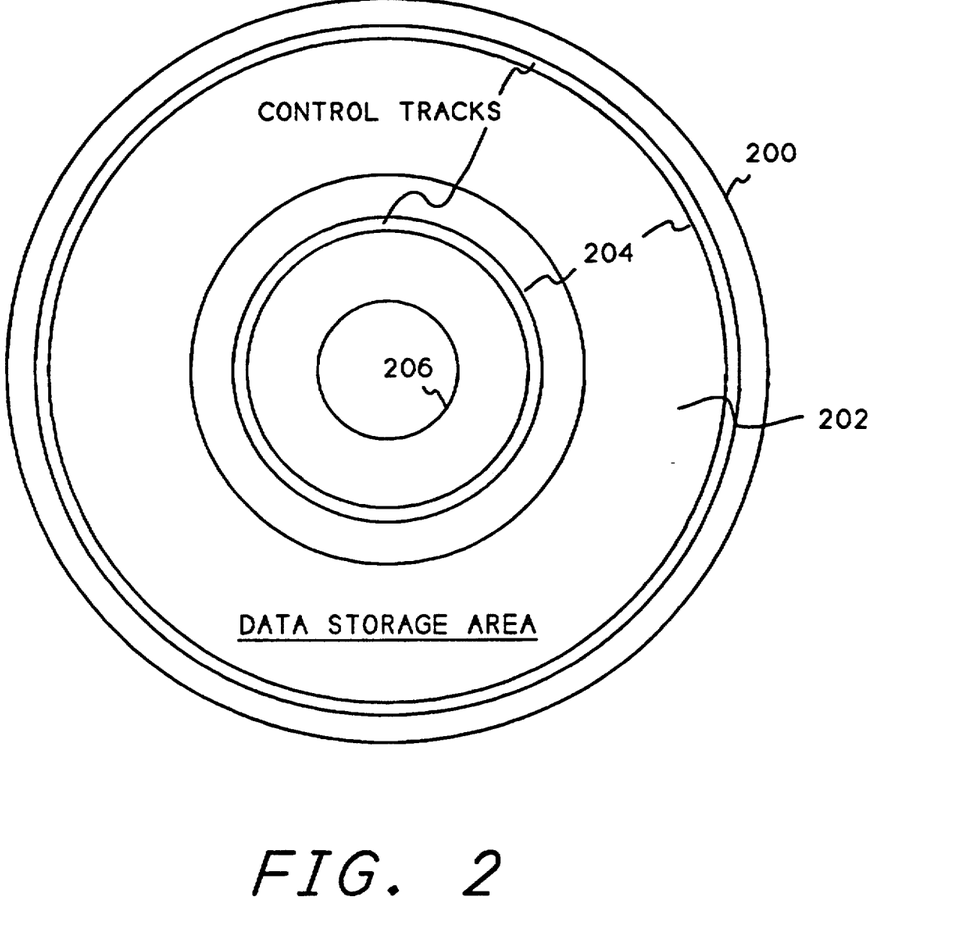
FIG. 2 is a diagram of an optical disk for use with the present invention.

FIG. 2 is a diagram of an optical disk storage media suitable for use with the present invention. Referring now to FIG. 2, disk 200 contains a data storage area 202 used to store user data in sectors. On either side of the storage area 202 are control tracks 204 which contain the media descriptor table of the present invention. A center hole 206 is used to center the media on the spindle of the optical drive 126 (FIG. 1). The disk 200 is typically surrounded by a cartridge (not shown) to protect the disk during storage. The data storage area 202 and the control tracks 204 are accessible through a slot in the cartridge.

Figure 3:
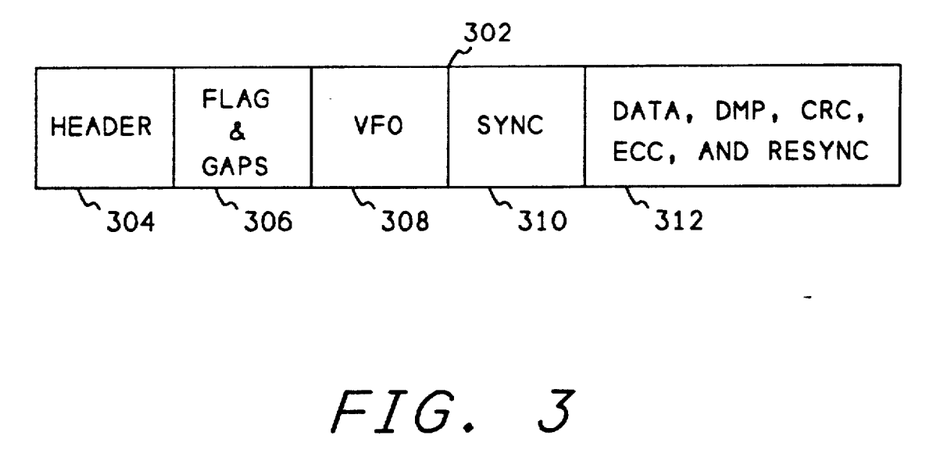
FIG. 3 is a diagram of the layout of a sector of data including the DMP used in the present invention.

FIG. 3 shows the format for a sector of data including the DMP format of the present invention. Referring now to FIG. 3, a sector 302 contains a header 304. The header 304 contains such information as the track and sector number as well as various timing marks to synchronize the controller to read the following data. Following the header 304 is a flag and gaps area 306 which provides a buffer area between the header the following information. Next follows a VFO area 308 and a synchronization byte 310. Following the synchronization byte 310 is the data, DMP, CRC, ECC, and re-sync area 312. This area includes the user data, as well as the defect management pointer area used by the present invention.

Figure 4:
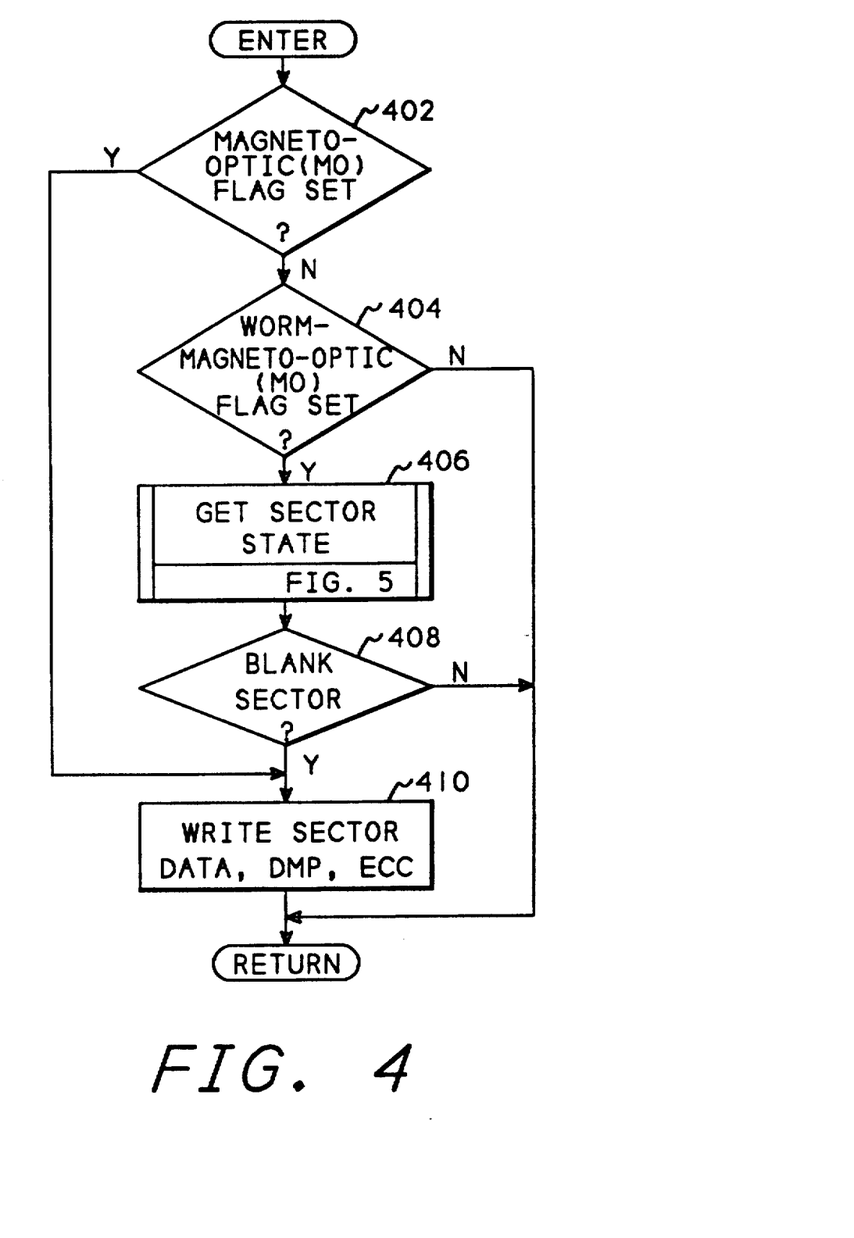
FIG. 4 is a flowchart of the process of writing a sector in the present invention.

FIG. 4 is flowchart of the process of writing a sector in the present invention. Referring now to FIG. 4, after entry, block 402 determines whether the magneto-optic flag is set. If the magneto-optic flag is set, meaning that the media is conventional magneto-optic, any sector on the media can be written at any time, therefore, block 402 transfers directly to block 410 to write the sector. If the magneto-optic flag is not set, block 402 transfers to block 404 which checks the WORM-MO flag to see if it is set. WORM-MO media is media that the present invention uses for write once operations. If the WORM-MO flag is not set, this media is not suitable to be written on, therefore, block 404 returns to the caller. If the WORM-MO flag is set, block 404 transfers to block 406 which calls FIG. 5 to get the sector status. Block 408 then checks the status to determine if the sector is blank, and thus writing is allowed. If writing is not allowed, block 408 returns to the caller. If writing is allowed, block 408 transfers to block 410 which writes the data in the sector, and sets the DMP information to hexadecimal "FF" (all ones) before returning to the caller.

Although the process of FIG. 4 allows a sector to be written only once, the process could be defined to allow writing of a sector many times, until a "change-state" command is received for the sector. This command would change the sector status to read-only and, thereafter, the drive would not write data into the sector.

Figure 5:
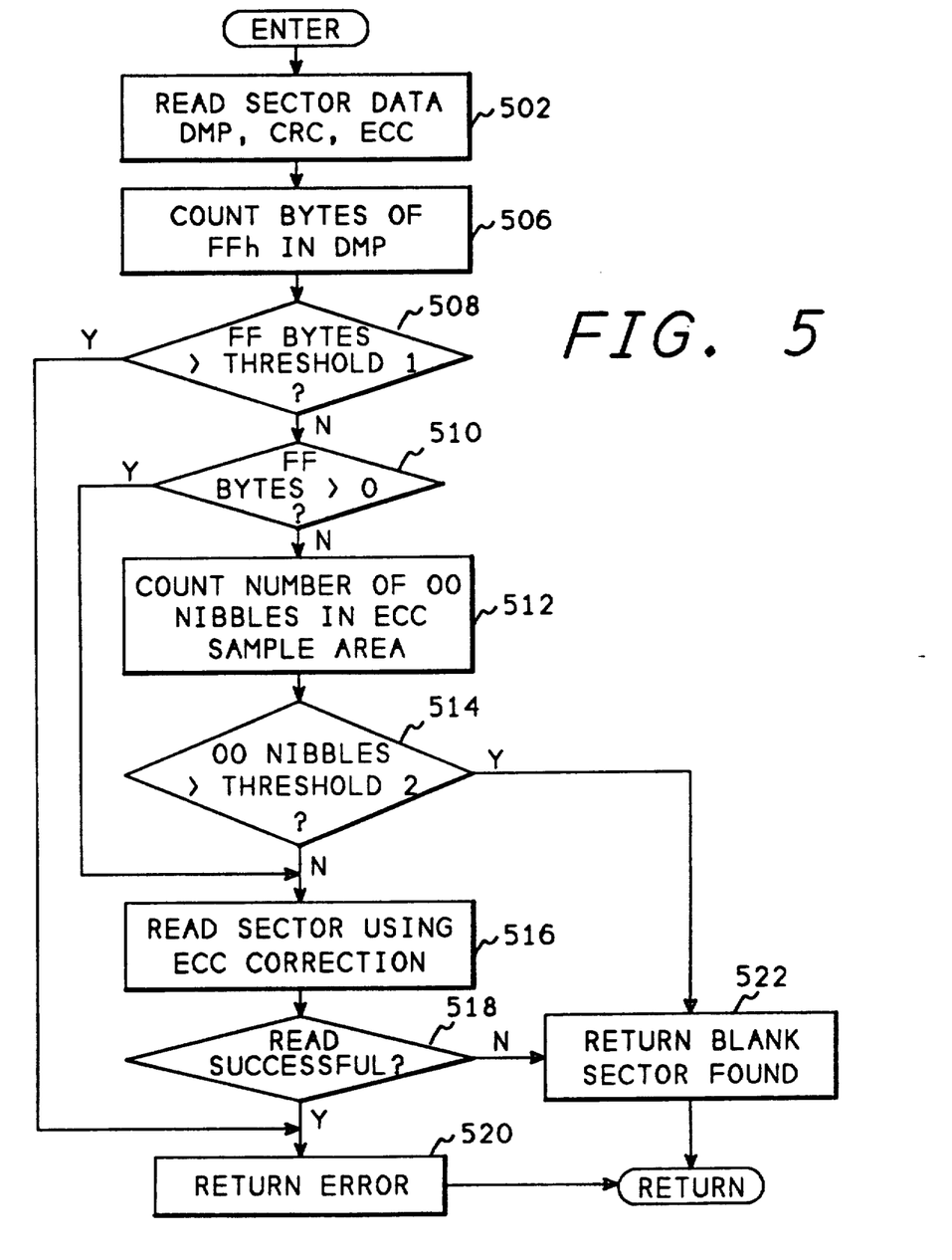
FIG. 5 is a flowchart of the process of determining whether a sector is blank during a write operation.

FIG. 5 shows a flowchart of the process of checking for a blank sector prior to performing a write operation. Referring now to FIG. 5, after entry, block 502 reads the sector information including the data, DMP information, CRC information, and ECC information. Block 506 counts the number of bytes of all ones (hexadecimal "FF") in the DMP section. Block 508 then determines if the number of bytes of all ones within the DMP section is greater than a threshold value, threshold one, which is typically three. If the number of bytes of all ones is greater than the threshold, then the sector has been written with data, and block 508 transfers to block 520 which returns an error indicating that the sector has been written, and to write again would cause an overwrite error. If the number of bytes of all ones is less than or equal to threshold one, block 508 transfers to block 510 which determines whether the number of bytes of all ones is greater than zero. If at least one byte of all ones has been encountered, the information in the DMP bytes is inconclusive, so block 510 transfers to block 516 which reads the entire section using ECC error correction to determine whether the sector contains data. If the number of bytes of all ones is zero, block 510 transfers to block 512 which counts the number of bytes of zeros in a sample of twelve bytes in the ECC area of the sector. Block 514 then checks the number of nibbles (four bits or half a byte) of zero found the ECC sample of the sector, and if this count is greater than a second threshold value, threshold two, which is typically four, block 514 transfers to block 522 to return an indication that the sector is indeed blank. If the number of nibbles of zero is less than or equal to the second threshold value, block 514 transfers to block 516 which reads the entire sector using ECC error correction techniques. Block 518 then determines if the read was successful, and if the read was not successful, the sector is a blank sector so block 518 transfers to block 522 to return the blank sector indication. If the read is successful, the sector contains data, so block 518 transfers to block 520 which returns an error condition indicating that the sector has been previously written. A test for an obliterated sector, such as will be described below with respect to FIG. 8, could also be made before allowing a write to the sector.

In the above description, blocks 512 and 516 are included to guard against larger defects in the DMP area. The reliability of the check of the ECC 12 byte sample depends upon the consistency in the read of sectors. If the (RLL 2,7) decoder in the drive consistently finds invalid bit patterns in erased sectors and defaults to null patterns, the method of using blocks 512 and 516 is effective. If not, performance can be improved by eliminating blocks 512 and 516.

Figure 6:
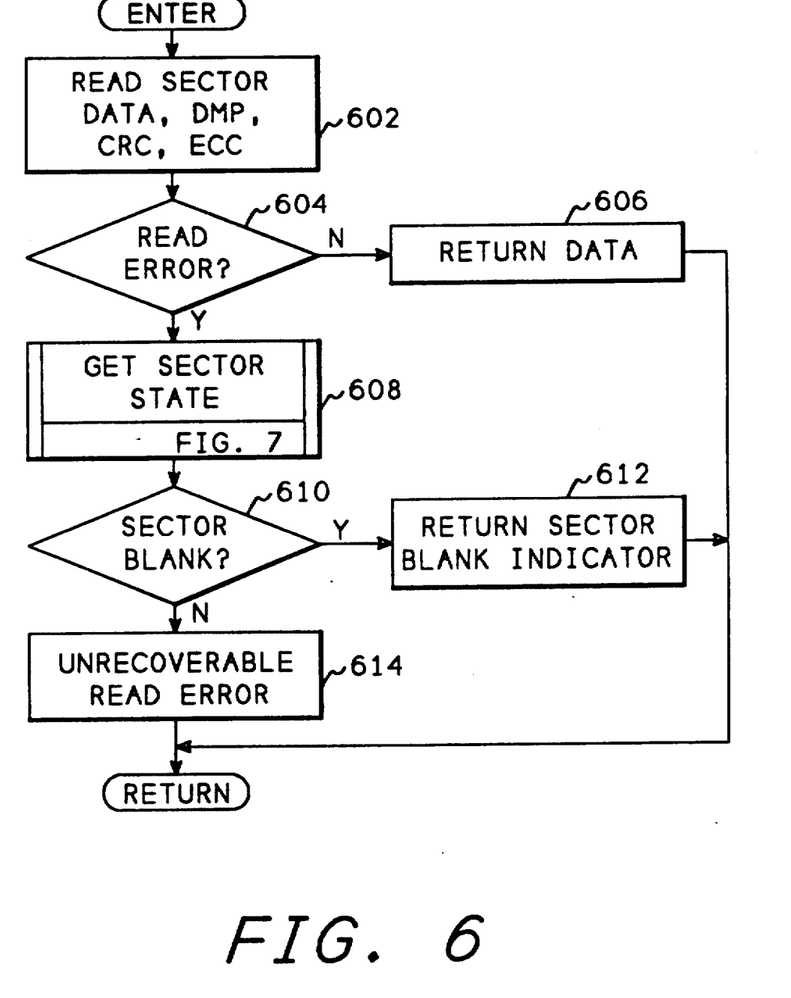
FIG. 6 is a flowchart of a read operation in the present invention.

FIG. 6 is a flowchart of a read operation in the present invention. Referring now to FIG. 6, after entry, block 602 reads the sector data as well as the DMP, CRC, and ECC information. Block 604 then determines if a read error occurred during the read. If no read error occurred, block 604 transfers to block 606 which returns the data to the user. If a read error did occur, block 604 transfers to block 608 which calls FIG. 7 to determine the sector status. Block 610 then checks the status to determine if the sector was blank, and if so, transfers to block 612 to return a block sector indication. If the sector was not blank, block 610 transfers to block 614 which returns an unrecoverable read error.

Figure 7:
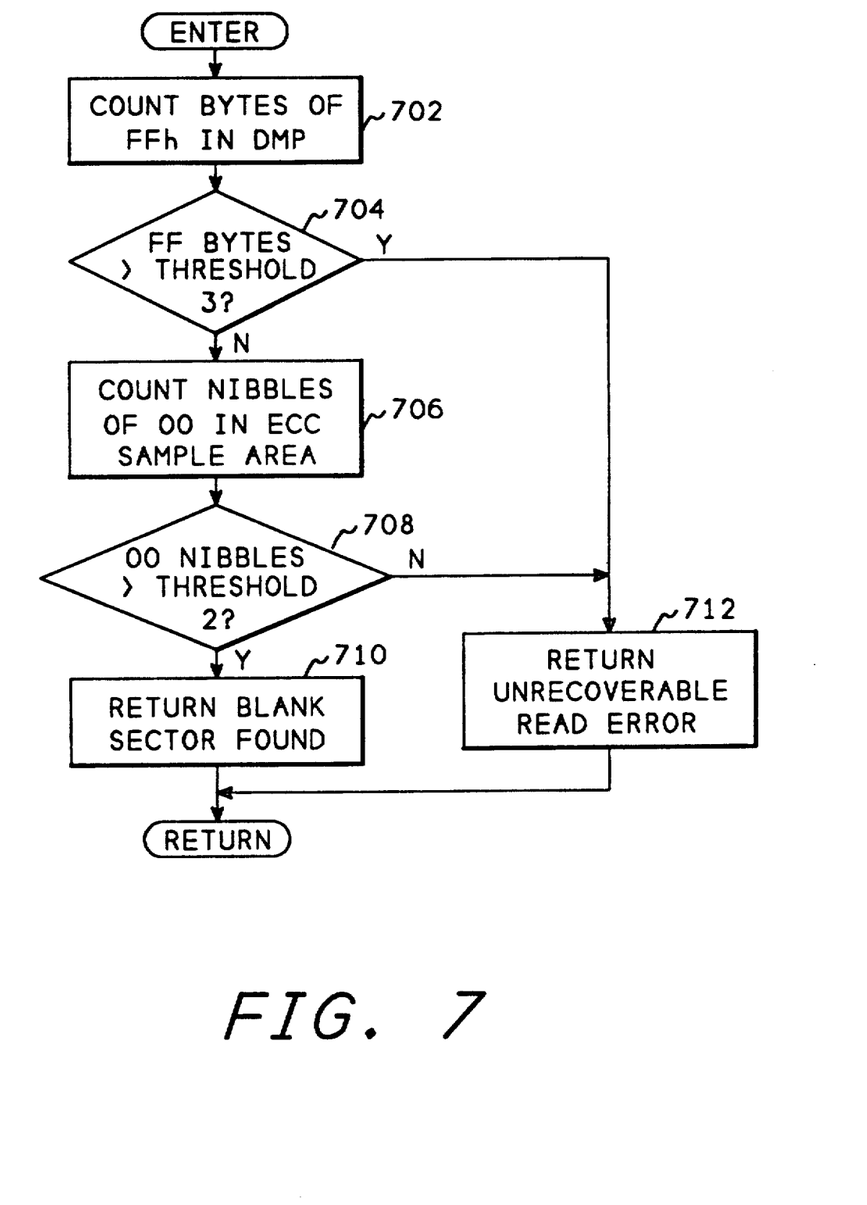
FIG. 7 is a flowchart of the process of determining whether a sector is blank after the sector failed to read correctly.

FIG. 7 shows a flowchart of the process of checking for a blank sector during a read operation. Referring now to FIG. 7, after entry, block 702 counts the bytes in the DMP area of the sector to determine how many of those bytes contain all ones. Block 704 then determines whether the number of all ones bytes is greater than a threshold value, Threshold Three. Typically, the value for Threshold Three is 2. If the number of all ones bytes is greater than the threshold, block 704 transfers to block 702 since the sector had been previously written and the read had failed, block 712 indicates an unrecoverable read error before returning to the caller. If the number of all ones bytes is less than or equal to Threshold Three, block 704 transfers to block 706 which counts the number of nibbles of all zeros in the ECC sample area of the sector. Block 708 then determines if the number of all zeros nibbles is greater than Threshold Two. The value for Threshold Two is typically four. If the number of zeros nibbles is less than or equal to Threshold Two, block 708 transfers to block 712 to indicate an unrecoverable read error. If the number of zeros nibbles is greater than Threshold Two, block 708 transfers to block 710 which returns an indication that a blank sector has been found.

Blocks 706 and 708 in the read sector status determination algorithm should be included under the same circumstances as inclusion of blocks 512 and 516, described above.

Figure 8:
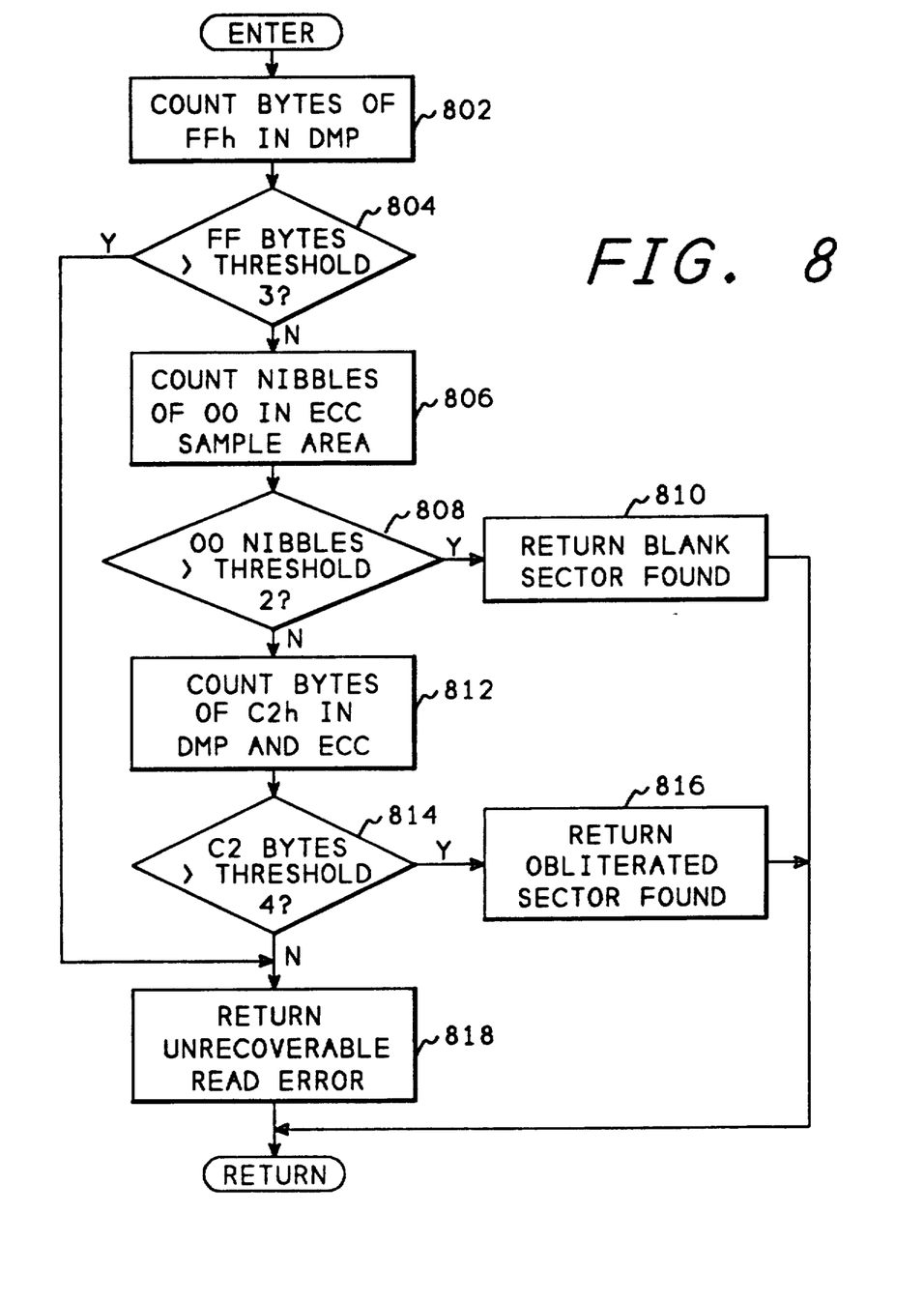
FIG. 8 is a flowchart of the process of determining whether a sector is blank after the sector failed to read correctly, and further including determining whether the sector had been previously obliterated.

FIG. 8 shows a flowchart of the process for determining the condition of a sector after a read operation, further including the ability to determine whether the sector data has been obliterated after having originally been written. This flowchart will be called from block 608 of FIG. 6 if obliterated sectors are allowed. Referring now to FIG. 8, after entry, block 802 counts the number of all ones bytes in the DMP area of the sector. Block 804 then determines whether the number of all ones bytes is greater than the value for Threshold Three, discussed above. If the number of all ones bytes is greater than the value for Threshold Three, block 804 transfers to block 818. If the number of all ones bytes is less than or equal to the value for Threshold Three, block 804 transfers to block 806 which counts the number of nibbles containing zero in the ECC sample area. Block 808 then determines whether the number of zeros nibbles is greater than the value for Threshold Two, discussed above. If the number of zeros nibbles is greater than the value for Threshold Two, block 808 transfers to block 810 which returns an indication that a blank sector has been found. If the number of zeros nibbles is less than or equal to the value for Threshold Two, block 808 transfers to block 812. Block 812 counts the number of bytes containing the value hexadecimal "C2" in the DMP and ECC sample area of the sector. Block 814 then determines whether the number of bytes containing hex "C2" is greater than a value Threshold Four. The value for Threshold Four is typically six. If the number of hex "C2" bytes is greater than Threshold Four, block 814 transfers to block 816 which returns an indication that the sector is an obliterated sector. If the number of hex "C2" bytes is less than or equal to the value of Threshold Four, block 814 transfers to block 818 which returns an indication that an unrecoverable read error has occurred.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for storing data comprising:
   a data storage device for reading and writing said data;
   storage media disposed within said data storage device for storing said data, wherein said storage media comprises a plurality of predefined portions and wherein each of said plurality of predefined portions comprises a data and an error recovery area;
   means contained in said error recovery area of each of said predefined portions of said data storage media for defining a storage state for each of said plurality of predetermined portions of said data storage media, and wherein said storage state comprises either a read-only state, a writable state, or an obliterated state; and
   means within said data storage device for changing said storage state of one of said predefined portions from said writable state to said read-only state when data is first written to said one of said plurality of predefined portions, and further changing said state to said obliterated state when previously written data is overwritten within said one of said predefined portions.

2. The system of claim 1 wherein said plurality of predefined portions of said data storage media comprise data storage sectors.

3. The system of claim 1 wherein said means for defining an obliterated state comprises writing a data pattern of hexadecimal "C2" into said error recovery area of said one of said predefined portions.

4. A process for storing data in a read-only form on writable media, said process comprising the steps of:
   (a) subdividing said media into a plurality of sectors, each of said sectors having data and error recovery areas;

(b) defining a storage state within said error recovery area of each of said sectors;

(c) examining said storage state prior to a write operation to one of said sectors;

(d) if said storage state indicates that said one of said sectors has a read-only state, canceling said write operation; and (e) if said storage state indicates that said sector has a writable state, proceeding with said write operation, and setting said storage state to a read-only state after said write operation is complete.

5. The process of claim 4 wherein step (c) further comprises the steps of:

(c1) reading said sector error recovery area;

(c2) counting the number of nibbles of all ones data in said error recovery area;

(c3) if said number of nibbles of all ones is greater than a first predetermined value, indicating that said sector has a read-only state;

(c4) counting the number of nibbles of all zero data in an ECC sample area;

(c5) if said number of nibbles of all zeros is greater than a second predetermined value, indicating that said sector has a writable state;

(c6) performing an error recovery read on said sector data; and (c7) if said error recovery read is unsuccessful, indicating that said sector has a writable state, otherwise indicating that said sector has a read-only state.

6. The process of claim 4 further comprising the steps of:

(f) if a read of a sector fails, examining said storage state and indicating an unrecoverable read error if said storage state indicates that said sector is written and indicating a block sector if said sector storage state indicates said sector is writable.

7. The process of claim 6 wherein step (f) further comprises the steps of:

(f1) counting the number of bytes of all ones data in said error recovery area;

(f2) if said number of bytes of all ones is greater than a third predetermined value, indicating that said sector has a read-only state and that an unrecoverable read error occurred;

(f3) counting the number of nibbles of all zero data in an ECC sample area;

(f4) if said number of bytes of all zeros is less than a fourth predetermined value, indicating that said sector has a read-only state and that an unrecoverable read error occurred; and (f5) indicating that said sector has a writable state.

* * * * *